(12) United States Patent
Imaoka et al.

(10) Patent No.: US 10,578,845 B2
(45) Date of Patent: Mar. 3, 2020

(54) ILLUMINATION OPTICAL SYSTEM AND PROJECTOR

(71) Applicant: KONICA MINOLTA, INC., Chiyoda-ku (JP)

(72) Inventors: Masayuki Imaoka, Izumiotsu (JP); Yasumasa Sawai, Yamatotakada (JP)

(73) Assignee: Konica Minolta, Inc., Tokyo (JP)

( * ) Notice: Subject to any disclaimer, the term of this patent is extended or adjusted under 35 U.S.C. 154(b) by 273 days.

(21) Appl. No.: 15/740,118

(22) PCT Filed: Jun. 22, 2016

(86) PCT No.: PCT/JP2016/068542
§ 371 (c)(1),
(2) Date: Dec. 27, 2017

(87) PCT Pub. No.: WO2017/002685
PCT Pub. Date: Jan. 5, 2017

(65) Prior Publication Data
US 2018/0188512 A1 Jul. 5, 2018

(30) Foreign Application Priority Data
Jun. 30, 2015 (JP) .................. 2015-131218

(51) Int. Cl.
*G02B 17/08* (2006.01)
*G02B 5/04* (2006.01)
(Continued)

(52) U.S. Cl.
CPC .............. *G02B 17/08* (2013.01); *G02B 5/04* (2013.01); *G02B 27/0955* (2013.01);
(Continued)

(58) Field of Classification Search
CPC ...... G02B 17/08; G02B 17/0856; G02B 5/04; G02B 27/0955; G02B 27/0972–0988;
(Continued)

(56) References Cited

U.S. PATENT DOCUMENTS

2012/0300180 A1* 11/2012 Jeon .................... G02B 27/1033
353/81

FOREIGN PATENT DOCUMENTS

JP 2004-046026 2/2004
JP 2008-268865 11/2008
(Continued)

OTHER PUBLICATIONS

JP 2012-247778, English language machine translation, created Nov. 14, 2019 via http://translationportal.epo.org (Year: 2012).*
(Continued)

*Primary Examiner* — Stephone B Allen
*Assistant Examiner* — Adam W Booher
(74) *Attorney, Agent, or Firm* — Cozen O'Connor

(57) ABSTRACT

An illumination optical system includes a lens group, a diaphragm, and a prism unit including first to third prisms and a rotationally-asymmetrical curved reflective surface having a positive power and satisfying the conditional formula: $PYa/PZa < PYb/PZb$, where $Pya$, $Pyb$ represent powers of the curved reflective surface at positions of points a, b, respectively within a reference plane formed in the prism unit by rays passing through centers of the lens group and the diaphragm, and $PZa$, $PZb$ represent powers of the curved reflective surface at positions of points a, b, respectively, within a plane including normal lines of the reference plane and the curved reflective surface, points a and b representing where the principal ray of a beam illuminating the area nearest and farthest, respectively, to the lens group impinges on the curved reflective surface, along an inter-
(Continued)

section line between an image display surface and the reference plane.

10 Claims, 6 Drawing Sheets

(51) Int. Cl.
*G03B 21/00* (2006.01)
*G02B 27/09* (2006.01)
*G03B 21/20* (2006.01)
*G02B 19/00* (2006.01)
*G02B 26/00* (2006.01)

(52) U.S. Cl.
CPC ....... *G03B 21/008* (2013.01); *G03B 21/2066* (2013.01); *G02B 19/0023* (2013.01); *G02B 26/008* (2013.01)

(58) Field of Classification Search
CPC ............................ G02B 19/00; G02B 19/0004; G02B 19/0019; G02B 19/0023; G02B 19/0028; G02B 19/0047; G02B 26/007; G02B 26/008; G03B 21/008; G03B 21/005; G03B 21/2066; F21V 7/00; F21V 7/04

See application file for complete search history.

(56) References Cited

FOREIGN PATENT DOCUMENTS

| | | |
|---|---|---|
| JP | 2012-98366 | 5/2012 |
| JP | 2012-247778 | 12/2012 |

OTHER PUBLICATIONS

JP 2012-098366, English language machine translation, created Nov. 14, 2019 via http://translationportal.epo.org (Year: 2012).*
JP 2008-268865, English language machine translation, created Nov. 14, 2019 via http://translationportal.epo.org (Year: 2008).*
DLP Tilt & Roll Pixel Architecture and DLP IntelliBrightTM, http://www.dlp.com/pico-projector/pico-poduct-developers/2trp-chip.aspx.

* cited by examiner

FIG.2A EX1
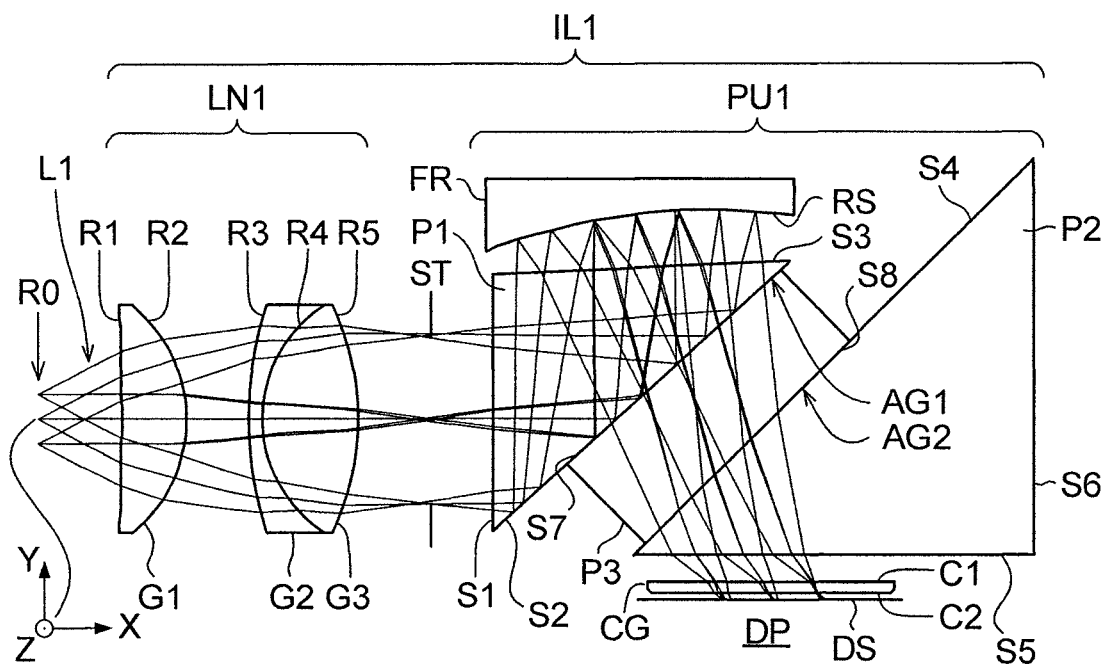
FIG.2B EX1
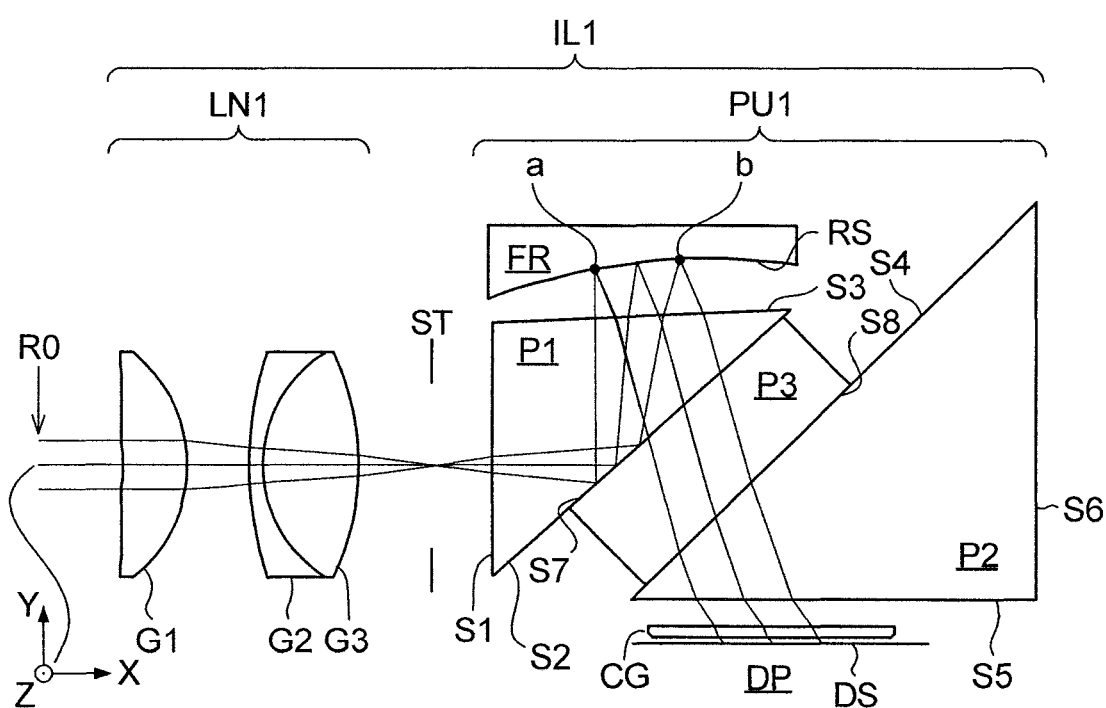

FIG.3A EX2
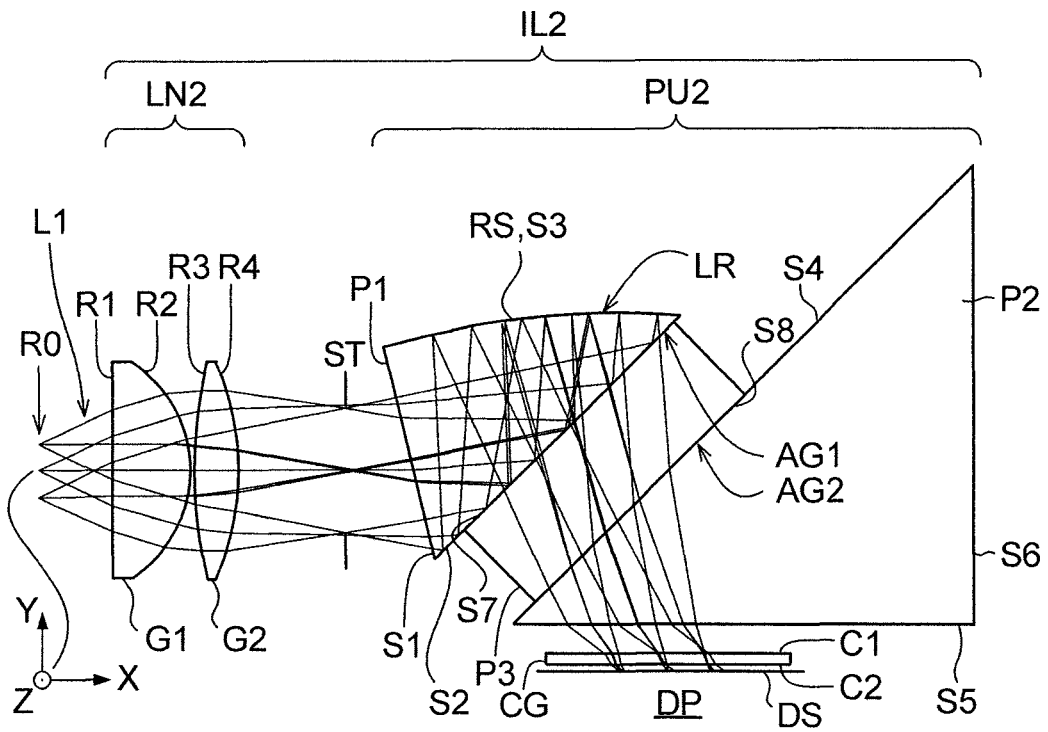
FIG.3B EX2
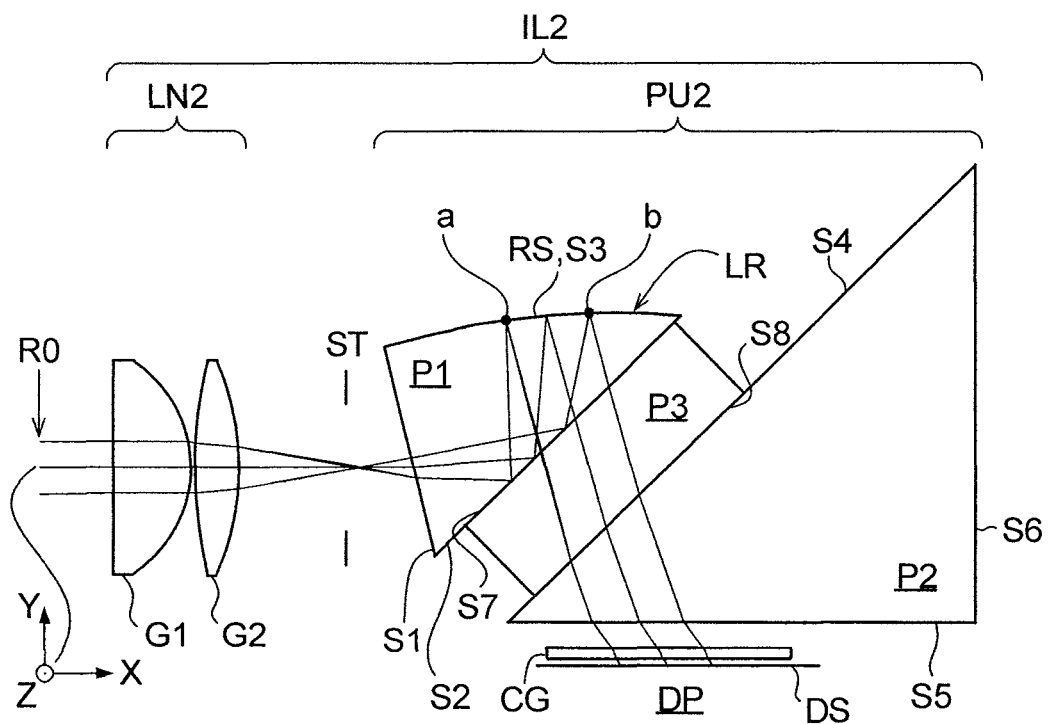

EX1

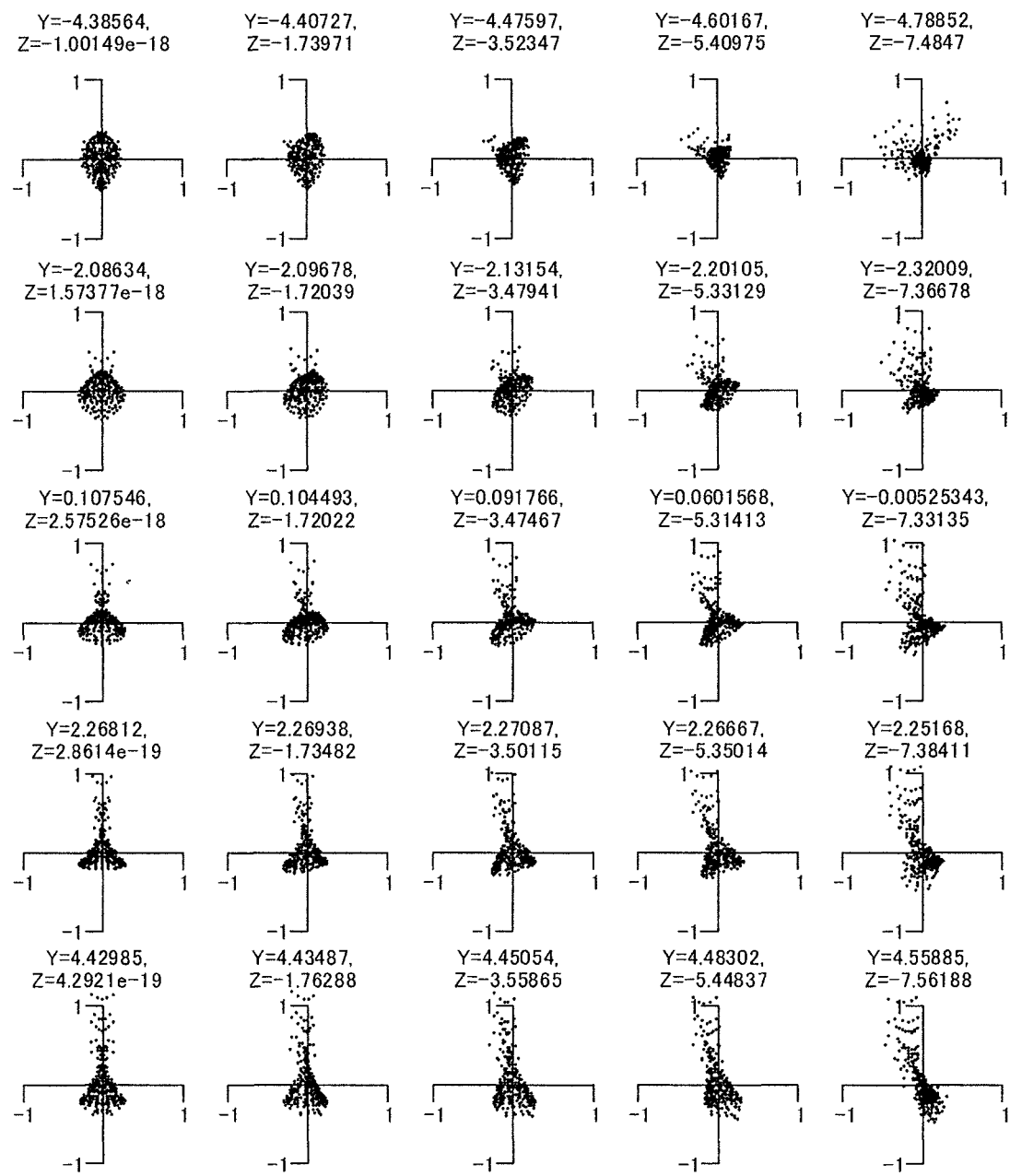

ILLUMINATION OPTICAL SYSTEM AND PROJECTOR

TECHNICAL FIELD

The present invention relates to an illumination optical system and a projector. More particularly, the present invention relates to an illumination optical system for illuminating a reflective image display element such as a digital micromirror device, for example, and a one-chip projector provided therewith.

BACKGROUND ART

In a projector employing a DLP (digital light processing; a registered trademark of Texas Instruments Inc., USA) method, image projection is performed using an optical semiconductor called a DLP chip, in which millions of minute mirrors (micromirrors) are incorporated. In a projector employing a three-chip DLP method, in which three DLP chips are used, a special prism is used to decompose lamp light into beams of the three primary RGB colors of light, each of which illuminates one of the three DLP chips to display a color image, whereas, in contrast, in a projector employing a one-chip DLP method, in which one DLP chip is used, a single color wheel divided into three sections by the three RGB colors is used to decompose lamp light into beams of the three primary RGB colors of light, all of which illuminate the one DLP chip to display a color image. The color wheel rotates at a high speed, in accordance with which each micromirror is switched on/off at a high speed, and this causes an afterimage effect on human eyes for them to see an image of multiple colors produced by synthesis of the RGB colors.

Digital micromirror devices, represented by the DLP chip described above, are widespread as reflective image display elements for use in projectors. A digital micromirror device has an image display surface formed of a plurality of minute micromirrors, and controls the tilt of each mirror surface on the image display surface to modulate the intensity of illumination light, and thereby forms an image. In other words, switching on and off of each pixel of the digital micromirror device is expressed by ±12°-rotation of a mirror surface about a rotational axis at an angle of 45° with respect to each side of the image display surface (that is, micromirror drive about one axis), for example. In regard to the movement of micromirrors, a digital micromirror device of a new operation type (Tilt & Roll Pixel DMD) in which micromirrors are driven with respect to two axes orthogonal to each other is also suggested in Non-Patent Document 1.

Various types of reflective optical systems have been conventionally proposed as illumination optical systems for use in projectors incorporating reflective image display elements such as digital micromirror devices described above. For example, Patent Document 1 proposes an illumination optical system having a free-form mirror, and Patent Documents 2 and 3 each propose an illumination optical system having a curved reflective surface in a prism unit.

CITATION LIST

Patent Document

Patent Document 1: Japanese Patent Application published as No. 2004-46026
Patent Document 2: Japanese Patent Application published as No. 2008-268865
Patent Document 3: Japanese Patent Application published as No. 2012-247778

Non-Patent Document

Non-Patent Document 1: DLP Tilt & Roll Pixel Architecture and DLP IntelliBright™, Internet <URL:http://www.dlp.com/pico-projector/pico-product-developers/2trp-ch-ip-.aspx>

SUMMARY OF INVENTION

Technical Problem

In an illumination optical system disclosed in Patent Literature 1, the medium in an optical path constituted by a free-form mirror is air, and this makes the configuration disadvantageous in terms of achieving compact projectors. Patent Documents 2 and 3 do not provide data relating to the shapes of curved reflective surfaces, and thus it is not clear how efficiently aberration is corrected in their illumination optical systems. Further, with a configuration having an air gap between prisms, which lowers the freedom of design, it is difficult to optimize the height of a projector.

The present invention has been made against this background, and an object thereof is to provide a compact illumination optical system capable of using light efficiently despite its compactness, and a high contrast projector incorporating such an illumination optical system to thereby reduce undesired light.

Solution to Problem

To achieve the above objects, according to a first aspect of the present invention, an illumination optical system directs incoming illumination light to an image display element, which is reflective, to illuminate an image display surface of the image display element. The illumination optical system includes a lens group which converges the illumination light, a diaphragm which regulates a beam of the illumination light, and a prism unit which directs illumination light exiting the lens group or the diaphragm to the image display element. Here, the prism unit includes a first prism, a second prism, and a curved reflective surface which is rotationally asymmetric and has a positive optical power. The first prism has a first optical surface through which illumination light exiting the lens group or the diaphragm enters the first prism, a second optical surface which totally reflects illumination light incoming through the first optical surface, and a third optical surface through which illumination light totally reflected on the second optical surface is directed onto the curved reflective surface. The curved reflective surface reflects incident illumination light at different reflection angles to direct the illumination light through the third optical surface to the second optical surface such that the illumination light exits the first prism by passing through the second optical surface. The second prism has a fourth optical surface which has an air gap against the second optical surface, and through which illumination light exiting the first prism through the second optical surface enters the second prism, and a fifth optical surface through which illumination light incoming through the fourth optical surface exits the second prism to be directed to the image display element. The curved reflective surface satisfies the following conditional formula (1):

$$PYa/PZa < PYb/PZb \qquad (1)$$

where,
when
a plane formed in the prism unit by rays passing through centers of the lens group and the diaphragm is taken as a reference plane,
a point at which a principal ray of a beam illuminating a side nearest to the lens group along an intersection line between the reference plane and the image display surface impinges on the curved reflective surface is taken as point a, and
a point at which a principal ray of a beam illuminating a side farthest from the lens group along the intersection line between the reference plane and the image display surface impinges on the curved reflective surface is taken as point b, PYa represents an optical power that the curved reflective surface has at a position of point a within the reference plane;

PZa represents an optical power that the curved reflective surface has at the position of point a within a plane including a normal line of the reference plane and a normal line of the curved reflective surface;

PYb represents an optical power that the curved reflective surface has at a position of point b within the reference plane; and PZb represents an optical power that the curved reflective surface has at the position of point b within the plane including the normal line of the reference plane and the normal line of the curved reflective surface.

According to a second aspect of the present invention, in the illumination optical system according to the first aspect, the second prism further has a sixth optical surface through which projection light obtained by reflection of illumination light on the image display surface exits the second prism such that the projection light enters the second prism again through the fifth optical surface to be totally reflected on the fourth optical surface, and then exits the second prism through the sixth optical surface.

According to a third aspect of the present invention, in the illumination optical system according to the first or second aspect, the reference plane and a short-side direction of the image display surface are parallel to each other.

According to a fourth aspect of the present invention, in the illumination optical system according to any one of the first to third aspects, the prism unit further has a third prism between the first prism and the second prism, the third prism having a seventh optical surface which has an air gap against the second optical surface and through which the illumination light exiting the first prism through the second optical surface enters the third prism, and an eighth optical surface which has an air gap against the fourth optical surface and through which the illumination light entering the third prism through the seventh optical surface exits the third prism toward the fourth optical surface.

According to a fifth aspect of the present invention, in the illumination optical system according to any one of the first to fourth aspects, a reflective optical element having the curved reflective surface is disposed near the third optical surface of the first prism.

According to a sixth aspect of the present invention, in the illumination optical system according to any one of the first to fourth aspects, the third optical surface of the first prism has a shape of the curved reflective surface, and the curved reflective surface is constituted by forming a reflective film on the third optical surface.

According to a seventh aspect of the present invention, a projector includes a light source device which generates the illumination light, an image display element which has the image display surface, the illumination optical system according to any one of the first to sixth aspects which illuminates the image display surface, and a projection optical system which projects an image displayed on the image display surface onto a screen surface in an enlarged manner According to an eighth aspect of the present invention, the projector according to the seventh aspect further includes an integral rod which performs mixing of illumination light emitted from the light source device to uniformize spatial energy distribution of the illumination light, and emits the illumination light through an exit side end surface thereof which is conjugate, or substantially conjugate, to the image display surface.

According to a ninth aspect of the present invention, in the projector according to the eighth aspect, the exit side end surface of the integral rod has a trapezoidal shape such that one side of the exit side end surface corresponding to the side of the image display surface nearest to the lens group along the intersection line between the reference plane and the image display surface is longer than a side of the exit side end surface opposite to the one side.

According to a tenth aspect of the present invention, in the projector according to the eighth or ninth aspect, the following conditional formula (2) is satisfied:

$$5 < Li/Ld < 10 \qquad (2)$$

where
Li represents a distance from a center of the exit side end surface of the integral rod to a center of the image display surface in a long-axis direction of the integral rod, and
Ld represents a length of the image display surface in a direction along the reference plane.

Advantageous Effects of Invention

According to the present invention, with the configuration including a prism unit having a curved reflective surface formed in a distinctive shape, it is possible to achieve a compact illumination optical system capable of using light efficiently despite its compactness, and a high contrast projector in which undesired light is reduce by the provision of such an illumination optical system.

BRIEF DESCRIPTION OF THE DRAWINGS

FIGS. 2A and 2B are optical configuration diagrams showing a first embodiment (Example 1) of an illumination optical system;

FIGS. 3A and 3B are optical configuration diagrams showing a second embodiment (Example 2) of the illumination optical system;

FIG. 7 shows spot diagrams of Example 2.

DESCRIPTION OF EMBODIMENTS

Hereinafter, illumination optical systems and projectors according to one or more embodiments of the present invention and the like will be described with reference to the accompanying drawings. And such parts as are identical or equivalent among different embodiments are identified by common reference signs, and overlapping description will be omitted unless necessary.

Figure 1:
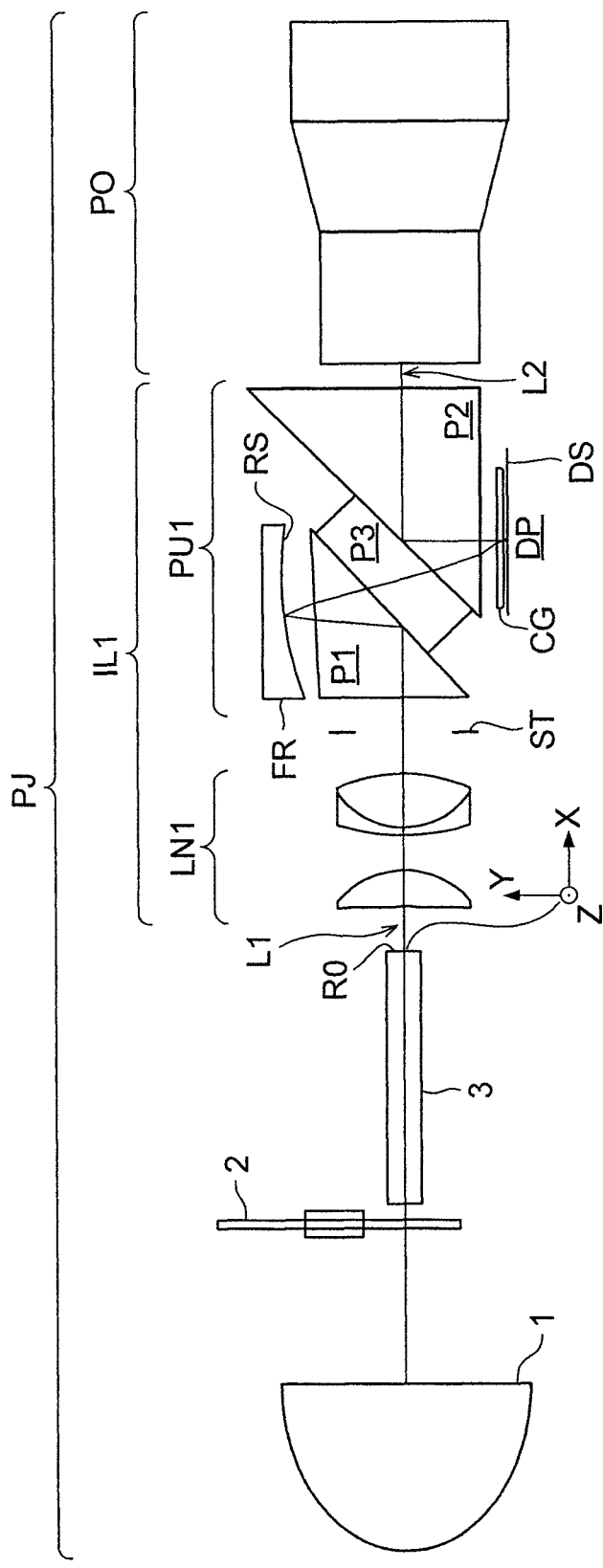
FIG. 1 is an outline configuration diagram showing an embodiment of a projector.

FIG. 1 shows an embodiment of a one-chip projector, and FIGS. 2A and 2B show a first embodiment of an illumination optical system mounted thereon. FIGS. 3A and 3B show a second embodiment of the illumination optical system mountable on the projector PJ shown in FIG. 1. In FIGS. 1 to 3B, a global rectangular coordinate system is an absolute coordinate system that coincides with a local rectangular coordinate system (X, Y, Z) having its origin at a center of a rod exit surface R0, where an X direction is a direction parallel to a normal line of the rod exit surface R0, and a Y direction is a direction parallel to a short side of the rod exit surface R0. Accordingly, surfaces of the sheets on which FIGS. 1 to 3B are drawn each correspond to an XY plane.

The projector PJ shown in FIG. 1 is configured to include a light source device 1, a color wheel 2, an integral rod 3, an illumination optical system IL1 (FIG. 1, FIGS. 2A and 2B), a projection optical system PO, a digital micromirror device DP, and so on. The light source device 1, which generates illumination light L1, is a white light source such as a xenon lamp, a laser light source, or the like, for example. The light source device 1 shown in FIG. 1 is configured such that a light emission point is located at a focal position of an ellipsoidal reflective surface of a lamp reflector so as for converged light emitted from the light source device 1 to be incident on the color wheel 2. The color wheel 2 is composed of three kinds of color filters which respectively pass R (red) light, G (green) light, and B (blue) light. By rotating the color wheel 2, colors of illumination light are switched sequentially with time, and by displaying image information corresponding to each color on the digital micromirror device DP, it is possible to color a projected image.

A beam passed through the color wheel 2 enters the integral rod 3. The integral rod 3 assumed here is a light intensity uniformizing element formed as a hollow rod by bonding four flat mirrors together. The illumination light L1 entering the integral rod 3 through an entrance side end surface (rod entrance surface) undergoes mixing by being repeatedly reflected on side surfaces (that is, inner wall surfaces) of the integral rod 3, as a result of which spatial energy distribution of the illumination light L1 is uniformized, and the resulting illumination light L1 exits the integral rod 3 through an exit side end surface (rod exit surface) R0.

The exit side end surface R0 of the integral rod 3 has a quadrangular shape (which may be rectangular or may be trapezoidal as will be described later) that is geometrically substantially similar to the shape of an image display surface DS of the digital micromirror device DP, and further, the exit side end surface R0 of the integral rod 3 is conjugate, or substantially conjugate, to the image display surface DS of the digital micromirror device DP. Hence, the uniform brightness distribution at the exit side end surface R0, which is achieved by the above-described mixing, contributes to efficient and uniform illumination of the digital micromirror device DP.

Here, the integral rod 3 is not limited to a hollow rod, and may also be a glass rod formed with a quadrangular prism-shaped glass body. Further, the number of side surfaces of the integral rod 3 is not limited to four but may also be any suitable number other than four as long as it fits the shape of the image display surface DS of the digital micromirror device DP. That is, the sectional shape of the integral rod 3 is not limited to a quadrangular shape such as a rectangle, a trapezoid, or the like. Thus, examples of the integral rod 3 used here include a hollow tube made by combining a plurality of reflective mirrors, a polygonal prism-shaped glass body, and the like.

The illumination light L1 exiting the integral rod 3 through the exit side end surface R0 enters the illumination optical system IL1 (FIGS. 2A and 2B) or the illumination optical system IL2 (FIGS. 3A and 3B) disposed behind the integral rod 3. The illumination optical systems IL1 and IL2 are catadioptric systems which direct the incoming illumination light L1 onto the digital micromirror device DP to illuminate the image display surface DS thereof. The illumination optical systems IL1 and IL2 include lens groups LN1, respectively, which converge the illumination light L1, a diaphragm ST which regulates a beam of the illumination light L1 exiting the lens groups LN1, and prism units PU1 and PU2, respectively, which direct the illumination light L1 exiting the diaphragm ST onto the digital micromirror device DP. Here, as illustrated in FIGS. 2A and 2B and FIGS. 3A and 3B, the exit side end surface R0 of the integral rod 3 and the image display surface DS are conjugate, or substantially conjugate, to each other. Note that optical paths in FIG. 1 indicate central principal rays of the illumination light L1 and a projection light L2, while the optical paths in each of FIG. 2A and FIG. 3A indicate on-axial and off-axial beams exiting the integral rod 3 through the rod exit surface R0, and principal rays of these beams alone are indicated by the optical paths in FIG. 2B and FIG. 3B.

The illumination light L1 entering the illumination optical system IL1 (FIG. 1, FIGS. 2A and 2B) of the first embodiment is converged by the lens group LN1, which includes three lens elements G1 to G3 (lens elements G2 and G3 are cemented together into a cemented lens element), and after being regulated by the diaphragm ST, the illumination light L1 is directed through the prism unit PU1 onto the digital micromirror device DP to illuminate the image display surface DS. The illumination light L1 entering the illumination optical system IL2 (FIGS. 3A and 3B) of a second embodiment is converged by the lens group LN2, which includes two lens elements G1 and G2, and after being regulated by the diaphragm ST, the illumination light L1 is directed through the prism unit PU2 onto the digital micromirror device DP to illuminate the image display surface DS. Here, although the diaphragm ST is arranged between the lens groups LN1, LN2 and the prism units PU1 and PU2 in the first and second embodiments, respectively, but this is not meant to limit the position of the diaphragm ST, and the diaphragm ST may be arranged in accordance with optical design. For example, the diaphragm ST may be arranged in the lens groups LN1 and LN2, or may be arranged in the prism units PU1 and PU2.

The prism unit PU1 (FIGS. 2A and 2B) is configured to have a first prism P1, a second prism P2, a third prism P3, and a reflective optical element FR, and the prism unit PU2 (FIGS. 3A and 3B) is configured to have the first prism P1, the second prism P2, and the third prism P3. The first prism P1 and the second prism P2 are triangular-prism shaped (in the prism unit PU2, the first prism P1 is substantially triangular-prism shaped) extending in the Z direction (a direction perpendicular to the surfaces of the sheets on which FIGS. 1 to 3B are drawn), and the third prism P3 is quadrangular-prism shaped extending in the Z direction. Further, the prism unit PU1 has a curved reflective surface RS in the reflective optical element FR, and the prism unit PU2 has a curved reflective surface RS in the first prism P1.

The third prism P3 is disposed between the first prism P1 and the second prism P2 such that an air gap AG1 is provided between the first prism P1 and the third prism P3 and an air gap AG2 is provided between the third prism P3 and the second prism P2. That is, the third prism P3 has the air gap AG1 against the first prism P1 (a second optical surface S2), and also has the air gap AG2 against the second prism P2 (a fourth optical surface S4), and as a result, the second prism P2 has the two air gaps AG1 and AG2 against the second optical surface S2 for total reflection.

In the prism units PU1 and PU2, the first prism P1 has a first optical surface S1 through which the illumination light L1 exiting the diaphragm ST enters the first prism P1, the second optical surface S2 which totally reflects the illumination light L1 entering the first prism P1 through the first optical surface S1, and a third optical surface S3 through which the illumination light L1 totally reflected on the second optical surface S2 is directed onto the curved reflective surface RS (FIGS. 2A and 2B, FIGS. 3A and 3B). The reflective optical element FR in the prism unit PU1 (FIG. 1, FIGS. 2A and 2B) of the first embodiment is what is called a free-form mirror, disposed near the third optical surface S3 of the first prism P1, and has the curved reflective surface RS which is rotationally asymmetric and has a positive optical power (the optical power is an amount defined as the reciprocal of a focal length). In the first prism P1 of the prism unit PU2 (FIGS. 3A and 3B) according to the second embodiment, the third optical surface S3 has the shape of the curved reflective surface RS, and a reflective film LR is formed thereon to constitute the curved reflective surface RS, which is rotationally asymmetric and has a positive optical power.

In each of the prism units PU1 and PU2, the curved reflective surface RS reflects the illumination light L1 incident thereon at different reflection angles to direct the illumination light L1 through the third optical surface S3 to the second optical surface S2 such that the illumination light L1 exits the first prism P1 by passing through the second optical surface S2. In the case of the prism unit PU1 (FIG. 1, FIGS. 2A and 2B) of the first embodiment, the illumination light L1 exiting the first prism P1 through the third optical surface S3 after being totally reflected on the second optical surface S2 is reflected on the curved reflective surface RS of the reflective optical element FR to enter the first prism P1 again through the third optical surface S3 to then exit the first prism P1 through the second optical surface S2. In the case of the prism unit PU2 (FIGS. 3A and 3B) of the second embodiment, since the curved reflective surface RS is constituted by the reflective film LR formed on the third optical surface S3, the illumination light L1 totally reflected on the second optical surface S2 does not exit the first prism P1 but is internally reflected on the third optical surface S3, constituting the curved reflective surface RS, to then exit the first prism P1 through the second optical surface S2.

In the prism units PU1 and PU2, the third prism P3 has a seventh optical surface S7 through which the illumination light L1 exiting the first prism P1 through the second optical surface S2 enters the third prism P3, and an eighth optical surface S8 through which the illumination light L1 entering the third prism P3 through the seventh optical surface S7 exits the third prism P3 toward the fourth optical surface S4. The second prism P2 has a fourth optical surface S4 through which the illumination light L1 passing through the third prism P3 after exiting the first prism P1 through the second optical surface S2 enters the second prism P2, a fifth optical surface S5 through which the illumination light L1 entering the second prism P2 through the fourth optical surface S4 exits the second prism P2 onto the digital micromirror device DP, and a sixth optical surface S6 through which the projection light L2 (FIG. 1) obtained by reflection of the illumination light L1 on the image display surface DS exits the second prism P2, such that the projection light L2 is directed to enter the second prism P2 again through the fifth optical surface S5 to be totally reflected on the fourth optical surface S4, and then exits the second prism P2 through the sixth optical surface S6.

The digital micromirror device DP is a reflective image display element which generates an image by modulating light, and as illustrated in FIGS. 1 to 3B, includes the image display surface DS which forms a two-dimensional image by modulating the intensity of the illumination light L1, a cover glass CG disposed over the image display surface DS, and so on. In the conventionally well-known digital micromirror device DP, each pixel has a rotation axis at an angle of 45° with respect to each side of a rectangular image forming region constituted by the image display surface DS, and switching on and off of each pixel is expressed by its rotation about the axis by ±12°. And only light reflected on an on-state micromirror (pixel surface) is allowed to pass through the projection optical system PO. On the other hand, in the case of a digital micromirror device of a new operation type (see Non-Patent Document 1, etc.), which is suitable to be used in the illumination optical systems IL1 and IL2, the rotation of a mirror surface is not about a single rotation axis but about two orthogonal rotation axes.

Figure 4:
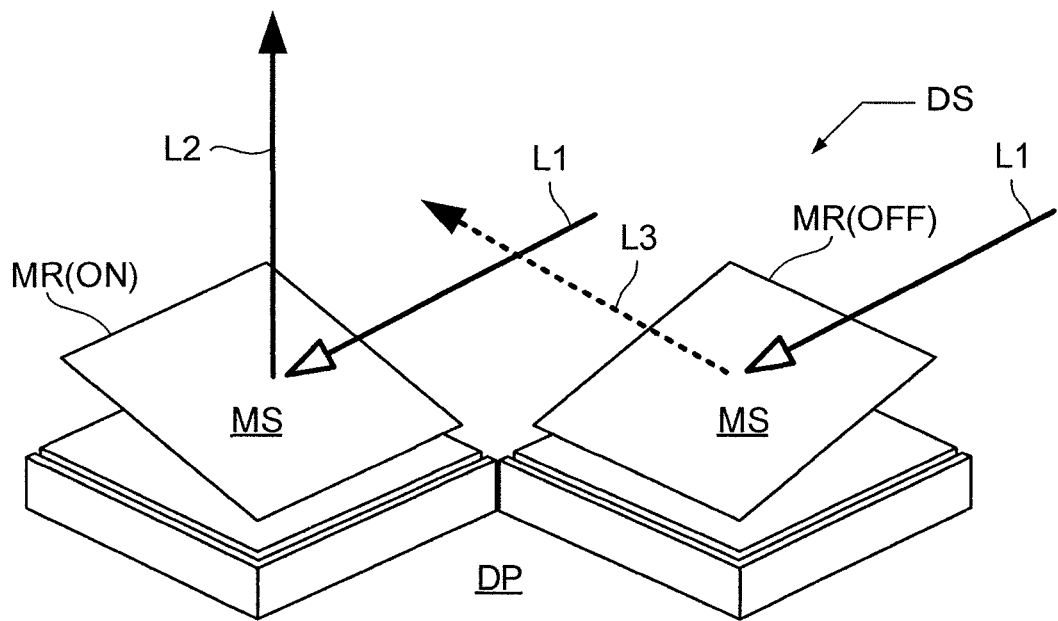
FIG. 4 is a perspective view for illustrating operation of a digital micromirror device that drives each micromirror with respect to two axes orthogonal to each other.

FIG. 4 shows a principal part of the digital micromirror device DP of the new operation type, that is, an ON-state and an OFF-state of a pixel that a micromirror MR constitutes with a rectangular pixel reflective surface (micromirror surface) MS. In this digital micromirror device DP (FIG. 4), on the image display surface DS formed with a plurality of image reflective surfaces MS, the turning ON/OFF of each pixel reflective surface MS is controlled such that the micromirror MR takes two angular states, namely, an image display state (ON state) and an image non-display state (OFF state), and thereby it is possible to modulate the intensity of the illumination light L1 to form a desired image.

As mentioned above, each micromirror is driven with respect to two axes orthogonal to each other, and thus, as can be understood from FIG. 4, the pixel reflection surface MS of the micromirror MR is tilted in one-side direction in the ON state, while, in the OFF state, it is tilted in another-side direction that is orthogonal to the one-side direction. In a usually assumed ON/OFF control, when the pixel reflective surface MS is in the ON state, the illumination light L1 incident on the micromirror MR is reflected in a normal direction of the image display surface DS to become ON light (the projection light) L2. When the pixel reflective surface MS is in the OFF state, the illumination light L1 incident on the micromirror MR is reflected in a direction at a large angle with respect to the normal direction of the image display surface DS to become OFF light (undesired light) L3. The projection light L2 enters the projection optical system PO to be projected onto a screen, whereas the OFF light L3 does not enter the projection optical system PO, and accordingly, is not projected onto the screen. As a result, an image is projected and displayed on the screen.

As described above, the illumination optical systems IL1 and IL2 are configured to direct the illumination light L1 to the image display surface DS of the digital micromirror device DP and to separate the projection light L2 from the illumination light L1 by means of the prism units PU1 and PU2 to project an image displayed on the image display surface DS on a screen surface in an enlarged manner through the projection optical system PO. And, for the purpose of achieving high light-use efficiency (that is, high illumination efficiency) by improving aberration performance of the illumination optical systems IL1 and IL2 while maintaining compactness of the projector PJ, the illumination optical systems IL1 and IL2 are configured to have the curved reflective surface RS having a distinct shape in the prism units PU1 and PU2.

Specifically, according to an embodiment of the present invention, an illumination optical system is configured to have a positive optical power in a prism unit which directs illumination light to a reflective image display element, and to have a rotationally asymmetric curved reflective surface (in other words, a reflective surface having a rotationally asymmetric free-form surface shape) which satisfies conditional formula (1) below:

$$PYa/PZa < PYb/PZb \quad (1)$$

where,
when
a plane formed in the prism unit by rays (corresponding to the central principal rays of the illumination light L1 and the projection light L2 in FIG. 1) passing through centers of the lens group and the diaphragm is taken as a reference plane (corresponding to an XY plane, which is the surface of each of sheets on which FIG. 1 and FIGS. 2A and 2B are drawn),
a point at which a principal ray of a beam illuminating a side nearest to the lens group along an intersection line between the reference plane and an image display surface impinges on the curved reflective surface is taken as point a, and
a point at which a principal ray of a beam illuminating a side farthest from the lens group along the intersection line between the reference plane and the image display surface impinges on the curved reflective surface is taken as point b (points a and points b of the first and second embodiments are illustrated in FIGS. 2B and 3B), PYa represents an optical power that the curved reflective surface has at a position of point a within the reference plane, PZa represents an optical power that the curved reflective surface has at the position of point a within a plane including a normal line of the reference plane and a normal line of the curved reflective surface, PYb represents an optical power that the curved reflective surface has at a position of point b within the reference plane, and PZb represents an optical power that the curved reflective surface has at the position of point b within the plane including the normal line of the reference plane and the normal line of the curved reflective surface.

Without the rotationally asymmetric curved reflective surface RS satisfying conditional formula (1), there is a risk that flare ascribable to increased aberration (coma aberration, for example) due to diagonal illumination could cause illumination loss, inviting degradation of light-use efficiency. With the rotationally asymmetric curved reflective surface RS satisfying conditional formula (1), it is possible to preferably correct aberration caused by diagonal illumination, and thus it is possible to reduce illumination loss to thereby improve light-use efficiency. And, by combination with a configuration where at least the first and second prisms P1 and P2 are used to separate the illumination light L1 and the projection light L2 from each other, improved light-use efficiency and compactness can both be achieved simultaneously. What is more, reduction of undesired light, which could cause aberration to invite illumination loss, contributes to improvement of contrast, and thus is effective to achieve a high-contrast projector PJ.

As described above, with the digital micromirror device of the new operation type (FIG. 4) in which each micromirror is driven with respect to two axes orthogonal to each other, the angle of illumination is large (the angle of illumination is 17 degrees while it is 12 degrees in the conventional type), so that it is impossible to avoid increase of uneven blur on the image display surface illuminated, and thus it is indispensable to correct such an uneven blur. The uneven blur can be corrected effectively by decentering an optical component (decentering a part of an optical system), but such decentering has a side effect of increasing coma aberration. Thus, to correct an uneven blur while simultaneously reducing occurrence of the coma aberration, a reflective surface having a rotationally asymmetric curved surface shape satisfying conditional formula (1) is effective.

In view of achieving compactness of the illumination optical systems IL1 and IL2 and the projector PJ, a configuration is preferable in which, as in the illumination optical systems IL1 and IL2, the second prism P2 further has the sixth optical surface S6 through which the projection light L2 (FIG. 1 and FIG. 4) obtained by reflection of the illumination light L1 on the image display surface DS exits the second prism P2 such that the projection light L2 enters the second prism P2 again through the fifth optical surface S5 to be totally reflected on the fourth optical surface S4 to then exit the second prism P2 through the sixth optical surface S6.

In view of achieving compactness of the illumination optical systems IL1 and IL2 and the projector PJ in a case where the digital micromirror device DP of the new operation type is used, a configuration is preferable in which, as in the illumination optical systems IL1 and IL2, the reference plane (corresponding to the XY plane which is the surface of each of sheets on which FIGS. 1, 2A, and 2B are drawn) and a short-side direction of the image display surface DS are parallel to each other.

It is preferable, as in the illumination optical system IL1 and IL2, for the prism unit PU1 to further have the third prism P3 between the first prism P1 and the second prism P2, and for the third prism P3 to have the seventh optical surface S7 which has the air gap AG1 against the second optical surface S2 and through which the illumination light L1 exiting the first prism P1 through the second optical surface S2 enters the third prism P3 and the eighth optical surface S8 which has the air gap AG2 against the fourth optical surface S4 and through which the illumination light L1 entering the third prism P3 through the seventh optical surface S7 exits the third prism P3 toward the fourth optical surface S4. The arrangement of the third prism P3 provided with the air gaps AG1 and AG2 helps increase the degree of design freedom, and thus makes it possible to optimize the height of the projector PJ. For example, it is possible to make the heights of projection and illumination optical axes to approximate to each other such that optical axes of the projection and illumination optical systems are aligned with each other. In addition, it is possible to arrange the digital micromirror device DP and its drive substrate without interference from the prism units PU1 and PU2 and the illumination optical system IL1 and IL2. Thus, it is possible to effectively achieve compactness of the illumination optical systems IL1 and IL2 and the projector PJ.

It is preferable, as in the illumination optical system ILL for the reflective optical element FR having the curved reflective surface RS to be disposed near the third optical surface S3 of the first prism P1. Adoption of a configuration where the reflective optical element FR is arranged in this manner makes it possible to adjust the area to be illuminated by tilting the reflective optical element FR, and thus to achieve illumination with improved light-use efficiency.

It is preferable, as in the illumination optical system IL2, for the third optical surface S3 of the first prism P1 to have the shape of the curved reflective surface RS, and for the reflective film LR to be formed on the third optical surface S3 to constitute the curved reflective surface RS. Adoption of a configuration where the reflective film LR is disposed in this manner makes it possible to reduce the number of components and also to reduce the height of the illumination optical system IL2.

The provision of the integral rod 3 as in the projector PJ shown in FIG. 1 is preferable, the integral rod 3 performing mixing of the illumination light L1 emitted from the light source device 1 to uniformize spatial energy distribution of the illumination light L1, and emitting the illumination light L1 through the exit side end surface R0 thereof, which is conjugate, or substantially conjugate, to the image display surface DS. This configuration allows the optical axes of the illumination and projection systems to be arranged parallel to each other, and thus the difference in height is reduced between the illumination and projection optical systems. This makes it possible to achieve compactness in the height direction, and thus to obtain a compact projector PJ having a low height. By further arranging the third prism P3, it also becomes possible to make adjustment to minimize the height, with consideration give to coincidence between the optical axes of the illumination and projection systems, and to other mechanical components.

In the projector PJ shown in FIG. 1, the exit side end surface R0 of the integral rod 3 has a rectangular shape. However, the exit side end surface R0 of the integral rod 3 may have a trapezoidal shape such that one side of the exit side end surface R0 corresponding to a side of the image display surface DS nearest to the lens group LN1 or LN2 along the intersection line between the reference plane and the image display surface DS is longer than a side of the exit side end surface R0 opposite to the one side.

Figure 5A:
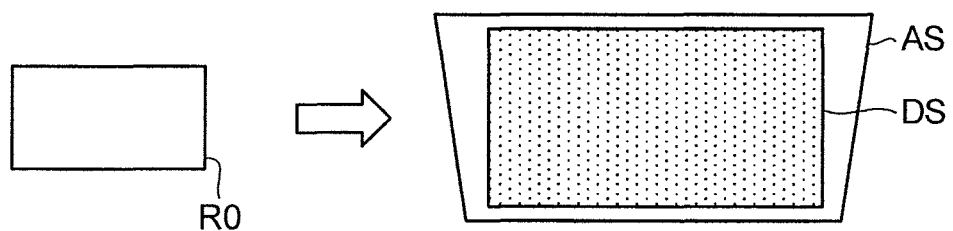
FIGS. 5A and 5B are schematic diagrams for illustrating the relationship between an exit side end surface of an integral rod and an illumination area on an image display surface.
Figure 5B:
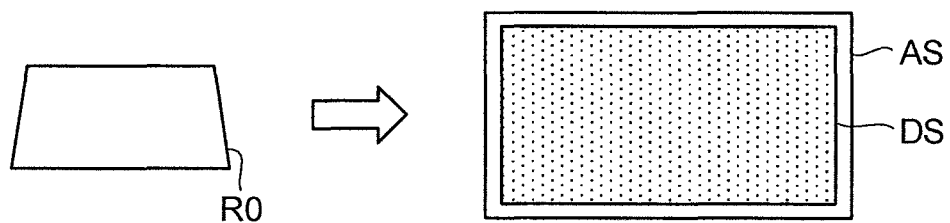

FIG. 5A shows that in a case where the rod exit surface R0 has a rectangular shape, an illumination area AS on the image display surface DS has a trapezoidal shape. FIG. 5B shows that in a case where the rod exit surface R0 has a trapezoidal shape, the illumination area AS on the image display surface DS has a rectangular shape. In the digital micromirror device of the new operation type (FIG. 4), since the angle of illumination is large, distortion aberration is caused by diagonal illumination as shown in FIG. 5A. In contrast, with the rod exit surface R0 formed in a trapezoidal shape as shown in FIG. 5B, it is possible to cancel out the distortion aberration caused by diagonal illumination, and thus to achieve effectively improved illumination efficiency.

It is preferable to satisfy conditional formula (2) below:

$$5 < Li/Ld < 10 \quad (2)$$

where $Li$ represents a distance from a center of the exit side end surface of the integral rod to a center of the image display surface in a long-axis direction of the integral rod, and $Ld$ represents a length of the image display surface in a direction along a reference plane (in other words, a length of the short side of the image display surface in a configuration where the reference plane and a short-side direction of the image display surface are parallel to each other).

If the value of $Li/Ld$ is below the lower limit of conditional formula (2), there is a risk that aberration would increase to degrade light-use efficiency or cause interference among components. If the value of $Li/Ld$ is above the upper limit of conditional formula (2), not only the illumination optical system increases in size, but also aberration balance is changed to give rise to a tendency for the advantageous effect of conditional formula (1) to be difficult to obtain. Thus, the satisfaction of the conditional formula (2) makes it possible to obtain the advantageous effect of conditional formula (1) to the maximum, and thus to obtain a compact projector capable of projecting bright and clear images.

It is further desirable to satisfy conditional formula (2a) below:

$$6 < Li/Ld < 9 \quad (2a)$$

Conditional formula (2a) described just above specifies, in the range of the conditions specified by conditional formula (2) described above, a further preferable range of conditions based on the above-described viewpoints, etc. Hence, by satisfying conditional formula (2a), it is possible to further enhance the above-described advantageous effect.

EXAMPLES

Hereinafter, the configuration and other features of the illumination optical system embodying the present invention will be described in more detail with reference to construction data and the like of practical examples. Examples 1 and 2 (EX1 and EX2) presented below are numerical examples of illumination optical systems corresponding to the first and second embodiments, respectively, described previously, and thus, the optical construction diagrams (FIGS. 2A and 2B, FIGS. 3A and 3B) of the illumination optical systems IL1 and IL2 showing the first and second embodiments also show the optical sectional shape, the arrangement of optical elements, the illumination optical path, and other features of Examples 1 and 2, respectively. The schematic diagram (FIG. 1), showing an example of the outline of the configuration of the projector PJ, shows one incorporating the illumination optical system IL1 of Example 1.

The construction data of each of Examples 1 and 2 shows the optical arrangement through the entire system starting with the rod exit surface R0 (which is the exit side end surface of the integral rod 3 and corresponds to an object surface in enlargement projection of the illumination light L1) to the image display surface DS on an enlargement side (corresponding to an image surface in enlargement projection of the illumination light L1). By using a local rectangular coordinate system (X, Y, Z) described later, the opening size of the rod exit surface R0 (the opening shape is rectangular) will be indicated with respect to the Y direction and the Z direction, and the opening size of the case where the shape of the rod exit surface R0 is trapezoidal will also be indicated with respect to the Y direction and the Z direction. Further, the magnifications (13) and the F-numbers (Fno) of the illumination optical systems IL1 and IL2 will be indicated, and the positions of point a and point b will be indicated by using a global rectangular coordinate system (x, y, z) described later.

In the illumination optical system IL1 of Example 1 (EX1, FIGS. 2A and 2B), optical surfaces R1 to R5 are included in the three lens elements G1 to G3 constituting the lens group LN1, and the first to eighth optical surfaces S1 to S8 are included in the prism unit PU1 constituted by the first to third prisms P1 to P3. Between the lens group LN1 and the prism unit PU1, the diaphragm ST is disposed, and near the third optical surface S3, the reflective optical element FR, which has the curved reflective surface RS, is disposed.

In the illumination optical system IL2 of Example 2 (EX2, FIGS. 3A and 3B), the optical surfaces R1 to R4 are included in the two lens elements G1 and G2 constituting the lens group LN2, and the first to eighth optical surfaces S1 to S8 are included in the prism unit PU2 constituted by the first to third prisms P1 to P3. Between the lens group LN2 and the prism unit PU1, the diaphragm ST is disposed, the third optical surface S3 of the first prism P1 has the shape of the curved reflective surface RS, and the reflective film LR formed on the third optical surface S3 constitutes the curved reflective surface RS.

How each optical surface is arranged is represented by the coordinates (x, y, z) (unit: mm), as measured in the global rectangular coordinate system (x, y, z), of the origin (O) and the X-axis and Y-axis coordinate axis vectors (VX, VY) of the local rectangular coordinate system (X, Y, Z) established with its origin (O) located at the vertex of the optical surface. Here, all the coordinate systems are defined as right-hand systems, and the global rectangular coordinate system (x, y, z) is an absolute coordinate system that coincides with the local rectangular coordinate system (X, Y, Z) established for the rod exit surface R0. Thus, the origin (o) of the global rectangular coordinate system (x, y, z) coincides with the origin (O) located at the center of the rod exit surface R0, the vector VX on the rod exit surface R0 is parallel to a normal line of the rod exit surface R0, the vector VY is orthogonal to the vector VX and parallel to a short side of the rod exit surface R0. For an optical surface that forms part of a coaxial system with an optical surface represented by coordinate data (x, y, z) regarded as the foremost surface, its arrangement is represented by an axial distance T' (mm) in the X direction with respect to the immediately previous optical surface. Here, the axial distance T' is insignificant when the next optical surface has independent coordinates.

A surface shape of each optical element is represented by the curvature C0 ($mm^{-1}$), the radius of curvature r (mm), and the like of the optical surface, and the signs are determined with respect to the local coordinates of each optical surface. The shape of an aspherical surface (what is called a free-form surface) which is rotationally asymmetric is defined by the following formula (FS) using the local rectangular coordinate system (X, Y, Z) with its origin (O) located at the vertex of the surface. The free-form surface data is indicated in addition to other data. Here, the coefficient of a term that is not shown is zero, and $E-n = \times 10^{-n}$ is applied to all the pieces of data.

$$X = (C0 \cdot H^2)/\{1+\sqrt{(1-\varepsilon \cdot C0^2 \cdot H^2)}\} + \Sigma\{G(j,k) \cdot Y^j \cdot Z^k\} \quad (FS)$$

where, in formula (FS),

X represents an amount of displacement from the reference surface in the X direction at a height H (based on the surface vertex), H represents a height in a direction perpendicular to the X axis $\{H=\sqrt{(Y^2+Z^2)}\}$, C0 represents a curvature at the surface vertex (+/− is with respect to the X axis of the local rectangular coordinate system, the sign + indicating that a center of the curvature existing in the positive direction on the vector VX, C0=1/r), ε represents a quadric surface parameter, and G(j, k) represents a rotationally asymmetric aspherical surface coefficient of j-th of Y and k-th of Z.

A refractive index N of an entrance-side medium of each optical surface for d-line, a refractive index N' of an exit-side medium of each optical surface for d-line (taking a negative value when the optical surface is a reflective surface), and an Abbe number vd of an optical material are also indicated. Furthermore, Table 1 is provided to indicate data corresponding to, and data related to, each conditional formula with respect to each example.

Figure 6:
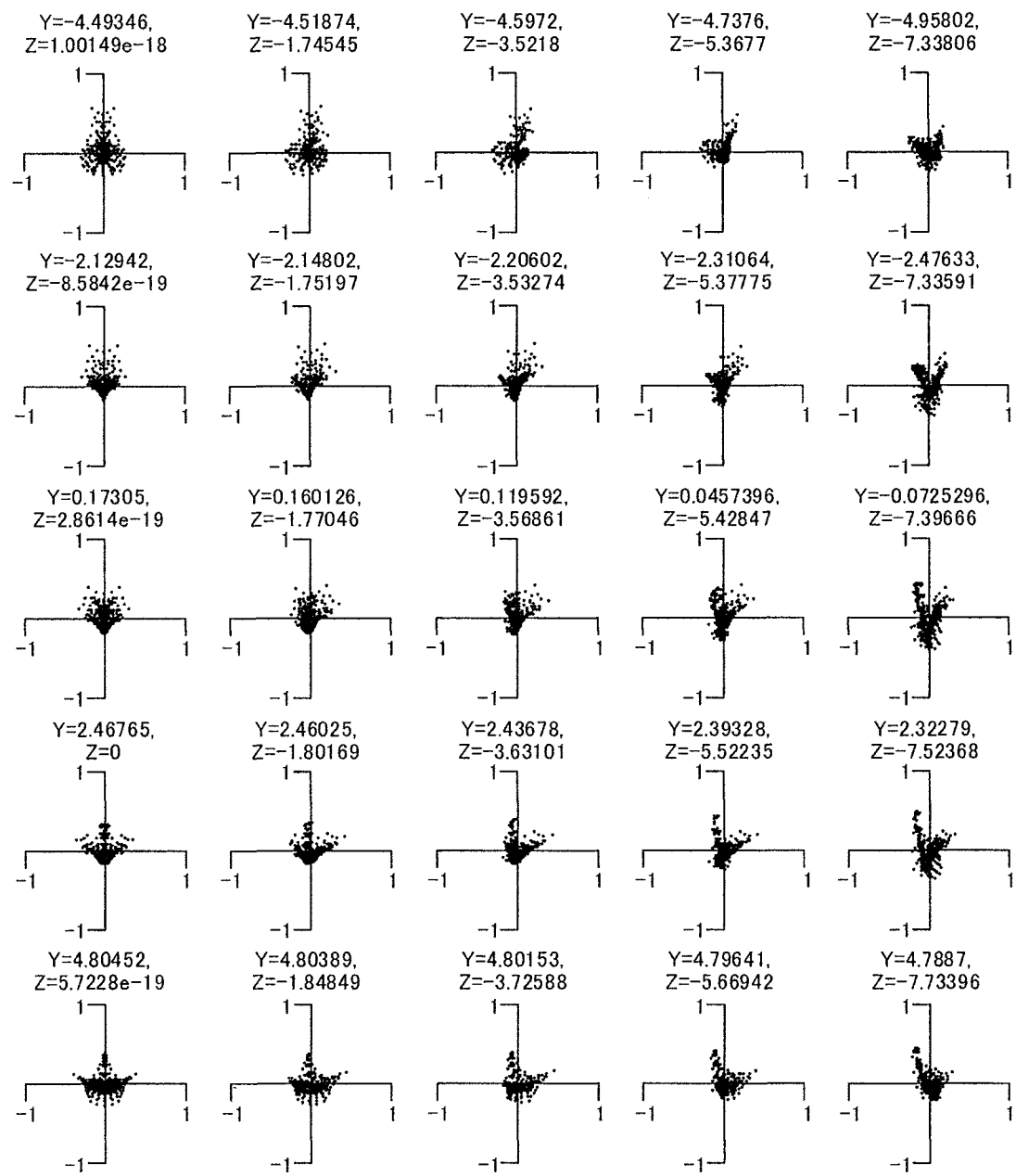
FIG. 6 shows spot diagrams of Example 1.

In the construction data of both Examples 1 and 2, the coordinates of the second optical surface S2 and those of the seventh optical surface S7 coincide with each other, and the coordinates of the eighth optical surface S8 and those of the fourth optical surface S4 coincide with each other; however, air gaps AG1 and AG2, each about several microns wide, are actually provided. On the data, a prism may be made smaller, or shifted back, by the amount of these air gaps, and in whichever case, there will be hardly any effect on performance FIG. 6 and FIG. 7 show spot diagrams of Examples 1 and 2, respectively. Each spot diagram shows the imaging performance (in ±1 mm divisions) observed for 3 different wavelengths (460 nm, 546 nm, and 620 nm) at 25 evaluation points on the image display surface DS. The coordinates (Y, Z) in the diagrams are local coordinates (Y, Z; mm; $e-n = \times 10^{-n}$) on the image display surface DS corresponding to the illumination positions of the spot centroids of the individual evaluation points. Since the examples are both constructed as optical systems plane-symmetric with respect to the XY-plane, each spot diagram only shows the positive-Z-side half of the image display surface DS, and the other half is omitted from illustration. The evaluation points are conjugate to vertically aligned five dividing points and horizontally aligned five dividing points which equally divide the Z-side half of the rod exit surface R0, and values obtained by multiplying the Y and Z values of the local coordinates of the points on the rod exit surface R0 with a magnification indicate the ideal imaging points on the spot diagrams, and the deviations from those calculated values indicate distortion.

Example 1

Opening size of integral rod: Y=±2.4, Z=±4.1
When having trapezoidal shape: Y=+2.4, Z=±4.1/Y=−2.4, Z=±3.9
β=1.8
Fno=1.1
Point a: 53.26, 19.11, 0.00
Point b: 61.30, 20.06, 0.00
Construction Data
R0 (rod exit surface)
[Coordinates]
O: 0.00, 0.00, 0.00
VX: 1.00, 0.00, 0.00
VY: 0.00, 1.00, 0.00
N=1.00000
C0=0.000000 (r=∞)
N'=1.00000
T'=8.03
R1 (front surface of lens element G1)
N=1.00000
C0=−0.003031 (r=−329.919)
N'=1.59142, vd=61.3
T'=6.17

R2 (rear surface of lens element G1)
N=1.59142, vd=61.3
C0=−0.069551 (r=−14.378)
N'=1.00000
T'=5.95
    R3 (front surface of lens element G2)
N=1.00000
C0=0.028094 (r=35.595)
N'=1.81263, vd=25.5
T'=1.30
    R4 (front surface of lens element G3)
N=1.81263, vd=25.5
C0=0.075960 (r=13.165)
N'=1.62032, vd=63.4
T'=9.22
    R5 (rear surface of lens element G3)
N=1.62032, vd=63.4
C0=−0.038689 (r=−25.847)
N'=1.00000
T'=6.86
    ST (diaphragm)
N=1.00000
C0=0.000000 (r=∞)
N'=1.00000
T'=0.00
    S1 (first optical surface)
[Coordinates]
O: 43.53, 0.00, 0.00
VX: 1.00, 0.00, 0.00
VY: 0.00, 1.00, 0.00
N=1.00000
C0=0.000000 (r=∞)
N'=1.51872, vd=64.2
T'=0.00
    S2 (second optical surface)
[Coordinates]
O: 55.77, 0.51, 0.00
VX: 0.68, −0.74, 0.00
VY: 0.74, 0.68, 0.00
N=1.51872, vd=64.2
C0=0.000000 (r=∞)
N'=−1.51872, vd=64.2
T'=0.00
    S3 (third optical surface)
[Coordinates]
O: 56.80, 14.50, 0.00
VX: −0.05, 1.00, 0.00
VY: 1.00, 0.05, 0.00
N=1.51872, vd=64.2
C0=0.000000 (r=∞)
N'=1.00000
T'=0.00
    RS (curved reflection surface of reflective optical element FR)
[Coordinates]
O: 60.14, 19.99, 0.00
VX: −0.07, 1.00, 0.00
VY: 1.00, 0.07, 0.00
N=1.00000
C0=−0.012415 (r=−80.545)
[Free-Form Surface Data]
ε=1.000000
G(2, 0)=−0.001948
G(3, 0)=1.541674E-5
G(4, 0)=−2.428665E-7
G(5, 0)=−2.464112E-8
G(6, 0)=−9.609595E-9
G(7, 0)=−3.599796E-10
G(8, 0)=6.216286E-11
G(9, 0)=−1.649594E-12
G(10, 0)=−2.581954E-13
G(0, 2)=−0.002320
G(1, 2)=3.662124E-5
G(2, 2)=5.338015E-6
G(3, 2)=2.129400E-7
G(4, 2)=−6.154090E-8
G(5, 2)=−9.561192E-10
G(6, 2)=5.391467E-10
G(7, 2)=2.969949E-11
G(8, 2)=2.424550E-13
G(0, 4)=2.425018E-6
G(1, 4)=8.523930E-8
G(2, 4)=−1.232254E-8
G(3, 4)=−2.644935E-9
G(4, 4)=2.431245E-11
G(5, 4)=−3.761591E-12
G(6, 4)=−5.842526E-14
G(0, 6)=−2.721729E-8
G(1, 6)=−1.930106E-9
G(2, 6)=1.586845E-12
G(3, 6)=2.017231E-11
G(4, 6)=3.236307E-13
G(0, 8)=1.660902E-10
G(1, 8)=5.982805E-12
G(2, 8)=5.749631E-13
G(0, 10)=−3.284335E-13
N'=−1.00000
T'=0.00
    S7 (seventh optical surface)
[Coordinates]
O: 55.77, 0.51, 0.00
VX: 0.68, −0.74, 0.00
VY: 0.74, 0.68, 0.00
N=1.00000
C0=0.000000 (r=∞)
N'=1.51872, vd=64.2
T'=0.00
    S8 (eighth optical surface)
[Coordinates]
O: 70.00, 0.00, 0.00
VX: 0.71, −0.71, 0.00
VY: 0.71, 0.71, 0.00
N=1.51872, vd=64.2
C0=0.000000 (r=∞)
N'=1.00000
T'=0.01
    S4 (fourth optical surface)
[Coordinates]
O: 70.00, 0.00, 0.00
VX: 0.71, −0.71, 0.00
VY: 0.71, 0.71, 0.00
N=1.00000
C0=0.000000 (r=∞)
N'=1.71616, vd=53.8
T'=0.00
    S5 (fifth optical surface)
[Coordinates]
O: 70.00, −13.00, 0.00
VX: 0.00, −1.00, 0.00
VY: 1.00, 0.00, 0.00
N=1.71616, vd=53.8
C0=0.000000 (r=∞)
N'=1.00000
T'=0.00

S6 (sixth optical surface)
[Coordinates]
O: 95.00, 0.00, 0.00
VX: 1.00, 0.00, 0.00
VY: 0.00, 1.00, 0.00
N=1.72539, vd=34.7
C0=0.000000 (r=∞)
N'=1.00000
T'=0.00
    C1 (front surface of cover glass CG)
[Coordinates]
O: 70.00, −15.70, 0.00
VX: 0.00, −1.00, 0.00
VY: 1.00, 0.00, 0.00
N=1.00000
C0=0.000000 (r=∞)
N'=1.48914, vd=70.4
T'=1.05
    C2 (rear surface of cover glass CG)
N=1.48914, vd=70.4
C0=0.000000 (r=∞)
N'=1.00000
T'=0.00
    DS (image display surface)
[Coordinates]
O: 70.00, −17.45, 0.00
VX: 0.00, −1.00, 0.00
VY: 1.00, 0.00, 0.00

Example 2

Opening size of integral rod: Y=±2.5, Z=±4.3
When having trapezoidal shape: Y=+2.5, Z=±4.3/Y=−2.5, Z=±4.1
β=1.7
Fno=1.15
Point a: 44.59, 14.36, 0.00
Point b: 52.55, 15.08, 0.00
    Construction Data
R0 (rod exit surface)
[Coordinates]
O: 0.00, 0.00, 0.00
VX: 1.00, 0.00, 0.00
VY: 0.00, 1.00, 0.00
N=1.00000
C0=0.000000 (r=∞)
N'=1.00000
T'=7.00
    R1 (front surface of lens element G1)
N=1.00000
C0=0.000000 (r=∞)
N'=1.51872, vd=64.2
T'=7.60
    R2 (rear surface of lens element G1)
N=1.51872, vd=64.2
C0=−0.079106 (r=−12.641)
N'=1.00000
T'=0.20
    R3 (front surface of lens element G2)
N=1.00000
C0=0.021831 (r=45.807)
N'=1.51872, vd=64.2
T'=4.41

R4 (rear surface of lens element G2)
N=1.51872, vd=64.2
C0=−0.038309 (r=−26.104)
N'=1.00000
T'=10.00
    ST (diaphragm)
N=1.00000
C0=0.000000 (r=∞)
N'=1.00000
T'=0.00
    S1 (first optical surface)
[Coordinates]
O: 35.79, 0.00, 0.00
VX: 0.97, 0.23, 0.00
VY: −0.23, 0.97, 0.00
N=1.00000
C0=0.000000 (r=∞)
N'=1.51872, vd=64.2
T'=0.00
    S2 (second optical surface)
[Coordinates]
O: 46.41, 0.00, 0.00
VX: 0.71, −0.71, 0.00
VY: 0.71, 0.71, 0.00
N=1.51872, vd=64.2
C0=0.000000 (r=∞)
N'=−1.51872, vd=64.2
T'=0.00
    S3 (third optical surface)
[Coordinates]
O: 58.48, 15.00, 0.00
VX: 0.09, 1.00, 0.00
VY: −1.00, 0.09, 0.00
N=1.51872, vd=64.2
C0=−0.017149 (r=−58.313)
[Free-Form Surface Data]
ε=−0.793389
G(1, 0)=−0.032899
G(2, 0)=0.000553
G(3, 0)=9.375342E-5
G(4, 0)=−1.093571E-5
G(5, 0)=2.754745E-7
G(6, 0)=2.553290E-8
G(7, 0)=−9.903741E-10
G(8, 0)=−6.022816E-11
G(9, 0)=3.646630E-12
G(10, 0)=−4.809709E-14
G(0, 2)=0.001089
G(1, 2)=−2.136717E-5
G(2, 2)=−5.700246E-6
G(3, 2)=−2.467022E-7
G(4, 2)=2.242302E-7
G(5, 2)=−1.314268E-8
G(6, 2)=−5.222106E-10
G(7, 2)=5.595393E-11
G(8, 2)=−1.089058E-12
G(0, 4)=5.461078E-6
G(1, 4)=−1.146900E-7
G(2, 4)=1.520111E-7
G(3, 4)=−3.009505E-8
G(4, 4)=1.241814E-9
G(5, 4)=2.271153E-11
G(6, 4)=−1.473292E-12
G(0, 6)=−5.194838E-8
G(1, 6)=−6.937911E-9
G(2, 6)=1.215145E-9
G(3, 6)=−3.817177E-11

G(4, 6)=7.105154E-14
G(0, 8)=2.640975E-10
G(1, 8)=5.224360E-12
G(2, 8)=-9.799716E-13
G(0, 10)=-4.052434E-13
N'=-1.51872, vd=64.2
T'=0.00
    S7 (seventh optical surface)
[Coordinates]
O: 46.41, 0.00, 0.00
VX: 0.71, -0.71, 0.00
VY: 0.71, 0.71, 0.00
N=1.00000
C0=0.000000 (r=∞)
N'=1.51872, vd=64.2
T'=0.00
    S8 (eighth optical surface)
[Coordinates]
O: 60.10, 0.00, 0.00
VX: 0.71, -0.71, 0.00
VY: 0.71, 0.71, 0.00
N=1.51872, vd=64.2
C0=0.000000 (r=∞)
N'=1.00000
T'=0.00
    S4 (fourth optical surface)
[Coordinates]
O: 60.10, 0.00, 0.00
VX: 0.71, -0.71, 0.00
VY: 0.71, 0.71, 0.00
N=1.00000
C0=0.000000 (r=∞)
N'=1.72539, vd=34.7
T'=0.00
    S5 (fifth optical surface)
[Coordinates]
O: 60.10, -15.00, 0.00
VX: 0.00, -1.00, 0.00
VY: 1.00, 0.00, 0.00
N=1.72539, vd=34.7
C0=0.000000 (r=∞)
N'=1.00000
T'=0.00
    S6 (sixth optical surface)
[Coordinates]
O: 87.10, 0.00, 0.00
VX: 1.00, 0.00, 0.00
VY: 0.00, 1.00, 0.00
N=1.72539, vd=34.7
C0=0.000000 (r=∞)
N'=1.00000
T'=0.00
    C1 (front surface of cover glass CG)
[Coordinates]
O: 60.10, -17.70, 0.00
VX: 0.00, -1.00, 0.00
VY: 1.00, 0.00, 0.00
N=1.00000
C0=0.000000 (r=∞)
N'=1.48914, vd=70.4
T'=1.05
    C2 (rear surface of cover glass CG)
N=1.48914, vd=70.4
C0=0.000000 (r=∞)
N'=1.00000
T'=0.00
    DS (image display surface)
[Coordinates]
O: 60.10, -19.45, 0.00
VX: 0.00, -1.00, 0.00
VY: 1.00, 0.00, 0.00

TABLE 1

| | Conditional Formula | Example 1 | Example 2 |
|---|---|---|---|
| (1) | PYa/PZa | 1.009 | 0.940 |
| (1) | PYb/PZb | 1.078 | 1.045 |
| (2) | Li/Ld | 8.11 | 6.94 |
| | PYa | 0.0342 | 0.0272 |
| | PYb | 0.0344 | 0.0309 |
| | PZb | 0.0339 | 0.0289 |
| | PZb | 0.0319 | 0.0296 |
| | Ld | 8.64 | 8.64 |
| | Li | 70.1 | 60.0 |

LIST OF REFERENCE SIGNS

PJ projector
IL1, IL2 illumination optical system
LN1, LN2 lens group
ST diaphragm
PU1, PU2 prism unit
P1-P3 1st-3rd prisms
S1-S8 1st-8th optical surfaces
AG1, AG2 air gap
FR reflective optical element
LR reflective film
RS curved reflective surface
DP digital micromirror device (reflective image display element)
DS image display surface
MR micromirror
MS pixel reflective surface
L1 illumination light
L2 projection light
AS illumination area
PO projection optical system
1 light source device
2 color wheel
3 integral rod
R0 rod exit surface (exit side end surface)

The invention claimed is:

1. An illumination optical system which directs incoming illumination light to an image display element, which is reflective, to illuminate an image display surface of the image display element, the illumination optical system comprising:
    a lens group which converges the illumination light;
    a diaphragm which regulates a beam of the illumination light; and
    a prism unit which directs illumination light exiting the lens group or the diaphragm to the image display element,
    wherein
        the prism unit includes a first prism, a second prism, and a curved reflective surface which is rotationally asymmetric and has a positive optical power,
        the first prism has
            a first optical surface through which illumination light exiting the lens group or the diaphragm enters the first prism,
            a second optical surface which totally reflects illumination light incoming through the first optical surface, and a third optical surface through which illumination light totally reflected on the second optical surface is directed onto the curved reflective surface, the curved reflective surface reflects incident illumination light at different reflection angles to direct the illumination light through the third optical surface to the second optical surface such that the illumination light exits the first prism by passing through the second optical surface, the second prism has
a fourth optical surface which has an air gap against the second optical surface, and through which illumination light exiting the first prism through the second optical surface enters the second prism, and
a fifth optical surface through which illumination light incoming through the fourth optical surface exits the second prism to be directed to the image display element, and the curved reflective surface satisfies the following conditional formula (1):

$$PYa/PZa < PYb/PZb \quad (1)$$

where,
when
a plane formed in the prism unit by rays passing through centers of the lens group and the diaphragm is taken as a reference plane,
a point at which a principal ray of a beam illuminating a side nearest to the lens group along an intersection line between the reference plane and the image display surface impinges on the curved reflective surface is taken as point a, and
a point at which a principal ray of a beam illuminating a side farthest from the lens group along the intersection line between the reference plane and the image display surface impinges on the curved reflective surface is taken as point b,
$PYa$ represents an optical power that the curved reflective surface has at a position of point a within the reference plane;
$PZa$ represents an optical power that the curved reflective surface has at the position of point a within a plane including a normal line of the reference plane and a normal line of the curved reflective surface;
$PYb$ represents an optical power that the curved reflective surface has at a position of point b within the reference plane; and
$PZb$ represents an optical power that the curved reflective surface has at the position of point b within the plane including the normal line of the reference plane and the normal line of the curved reflective surface.

2. The illumination optical system according to claim 1, wherein the second prism further has a sixth optical surface through which projection light obtained by reflection of illumination light on the image display surface exits the second prism such that the projection light enters the second prism again through the fifth optical surface to be totally reflected on the fourth optical surface, and then exits the second prism through the sixth optical surface.

3. The illumination optical system according to claim 1, wherein the reference plane and a short-side direction of the image display surface are parallel to each other.

4. The illumination optical system according to claim 1, wherein
the prism unit further has a third prism between the first prism and the second prism, the third prism having a seventh optical surface which has an air gap against the second optical surface and through which the illumination light exiting the first prism through the second optical surface enters the third prism, and an eighth optical surface which has an air gap against the fourth optical surface and through which the illumination light entering the third prism through the seventh optical surface exits the third prism toward the fourth optical surface.

5. The illumination optical system according to claim 1, wherein
a reflective optical element having the curved reflective surface is disposed near the third optical surface of the first prism.

6. The illumination optical system according to claim 1, wherein
the third optical surface of the first prism has a shape of the curved reflective surface, and
the curved reflective surface is constituted by forming a reflective film on the third optical surface.

7. A projector comprising:
a light source device which generates the illumination light;
an image display element which has the image display surface;
the illumination optical system according to claim 1 which illuminates the image display surface; and
a projection optical system which projects an image displayed on the image display surface onto a screen surface in an enlarged manner.

8. The projector according to claim 7, further comprising an integral rod which performs mixing of illumination light emitted from the light source device to uniformize spatial energy distribution of the illumination light, and emits the illumination light through an exit side end surface thereof which is conjugate, or substantially conjugate, to the image display surface.

9. The projector according to claim 8, wherein the exit side end surface of the integral rod has a trapezoidal shape such that one side of the exit side end surface corresponding to the side of the image display surface nearest to the lens group along the intersection line between the reference plane and the image display surface is longer than a side of the exit side end surface opposite to the one side.

10. The projector according to claim 8, wherein the following conditional formula (2) is satisfied:

$$5 < Li/Ld < 10 \quad (2)$$

where
$Li$ represents a distance from a center of the exit side end surface of the integral rod to a center of the image display surface in a long-axis direction of the integral rod, and
$Ld$ represents a length of the image display surface in a direction along the reference plane.

* * * * *